United States Patent
Ui et al.

(10) Patent No.: US 7,870,591 B2
(45) Date of Patent: Jan. 11, 2011

(54) MULTIPATH DATA TRANSMISSION SYSTEM WITH TRANSMISSION SEQUENCE IDENTIFICATION OF DATA PACKETS FOR SEQUENTIAL REORDERING OF RECEIVED DATA PACKETS

(75) Inventors: Katsunori Ui, Nisshin (JP); Hiroyuki Niwa, Nisshin (JP); Masatoshi Sugita, Nisshin (JP)

(73) Assignee: Masprodenkoh Kabushikikaisha, Aichi (JP)

( * ) Notice: Subject to any disclaimer, the term of this patent is extended or adjusted under 35 U.S.C. 154(b) by 300 days.

(21) Appl. No.: 11/586,064

(22) Filed: Oct. 25, 2006

(65) Prior Publication Data
US 2007/0113256 A1 May 17, 2007

(30) Foreign Application Priority Data
Oct. 28, 2005 (JP) ............................. 2005-314615

(51) Int. Cl.
H04N 7/173 (2006.01)
H04N 7/16 (2006.01)
H04B 1/38 (2006.01)
H04B 3/00 (2006.01)
G06F 15/16 (2006.01)

(52) U.S. Cl. ...................... 725/111; 725/117; 725/118; 725/147; 725/148; 725/149; 375/222; 375/257; 709/236; 709/246

(58) Field of Classification Search .................. 725/111, 725/117, 118, 147, 148, 149; 375/222, 257; 709/236, 246

See application file for complete search history.

(56) References Cited

U.S. PATENT DOCUMENTS

| | | | | |
|---|---|---|---|---|
| 4,703,475 A * | 10/1987 | Dretzka et al. | ............... | 370/394 |
| 6,134,237 A * | 10/2000 | Brailean et al. | ............. | 370/394 |
| 6,711,742 B1 * | 3/2004 | Kishi et al. | .................. | 725/111 |
| 6,763,032 B1 * | 7/2004 | Rabenko et al. | ............. | 370/442 |
| 6,807,193 B1 * | 10/2004 | Beser | .......................... | 370/498 |
| 6,963,931 B2 * | 11/2005 | Bunn et al. | .................. | 709/246 |
| 7,130,314 B2 * | 10/2006 | Bunn et al. | .................. | 370/474 |
| 7,389,527 B2 * | 6/2008 | Bunn et al. | .................. | 725/111 |
| 7,428,247 B2 * | 9/2008 | Bunn et al. | .................. | 370/474 |
| 7,450,579 B2 * | 11/2008 | Howard et al. | ............... | 370/389 |
| 7,451,235 B2 * | 11/2008 | Bunn et al. | .................. | 709/246 |

(Continued)

FOREIGN PATENT DOCUMENTS

JP      5110600 A      4/1993

(Continued)

OTHER PUBLICATIONS

Notice of Reason(s) For Rejection, dated Sep. 14, 2010, Patent Application No. JP 2005-31615.
Translation of Notice of Reason(s) For Rejection, dated Sep. 14, 2010, Patent Application No. JP 2005-31615.

*Primary Examiner*—Hoang-Vu A Nguyen-Ba
(74) *Attorney, Agent, or Firm*—Davis & Bujold, P.L.L.C.

(57) ABSTRACT

A first communication apparatus includes a data transmission unit that sequentially transmits each data forming a data stream to any of a plurality of transmission paths along with additional information indicating transmission sequence of the each data. A second communication apparatus includes a sequence specification unit that specifies the transmission sequence of the each data based on the additional information provided with the each data sequentially received from the first communication unit via the plurality of the transmission paths.

16 Claims, 4 Drawing Sheets

U.S. PATENT DOCUMENTS

| | | | |
|---|---|---|---|
| 7,508,785 B2* | 3/2009 | Dale et al. | 370/322 |
| 2002/0062394 A1* | 5/2002 | Bunn et al. | 709/246 |
| 2002/0073227 A1* | 6/2002 | Bunn et al. | 709/236 |
| 2004/0095963 A1* | 5/2004 | Rakib | 370/503 |
| 2004/0105403 A1* | 6/2004 | Lin et al. | 370/316 |
| 2004/0244043 A1* | 12/2004 | Lind et al. | 725/111 |
| 2006/0039380 A1* | 2/2006 | Cloonan et al. | 370/395.4 |
| 2006/0182139 A1* | 8/2006 | Bugajski et al. | 370/464 |
| 2007/0064705 A1* | 3/2007 | Tateno et al. | 370/394 |
| 2007/0271588 A1* | 11/2007 | Bunn et al. | 725/111 |
| 2008/0046607 A1* | 2/2008 | Horton et al. | 710/30 |

FOREIGN PATENT DOCUMENTS

| | | | |
|---|---|---|---|
| JP | 5160859 A | | 6/1993 |
| JP | 11196130 A | | 7/1999 |
| JP | 2002064557 A | | 2/2002 |
| JP | 2004253893 A | | 9/2004 |
| JP | 2004304465 A | | 10/2004 |
| JP | 2005012711 A | | 1/2005 |
| JP | 2005-086274 | * | 3/2005 |
| JP | 2005086274 | | 3/2005 |
| JP | 2005086281 A | | 3/2005 |

* cited by examiner

MULTIPATH DATA TRANSMISSION SYSTEM WITH TRANSMISSION SEQUENCE IDENTIFICATION OF DATA PACKETS FOR SEQUENTIAL REORDERING OF RECEIVED DATA PACKETS

CROSS-REFERENCE TO RELATED APPLICATIONS

This application claims the benefit of Japanese Patent Application No. 2005-314615 filed Oct. 28, 2005 in the Japan Patent Office, the disclosure of which is incorporated herein by reference.

TECHNICAL FIELD OF THE INVENTION

This invention relates to a data transmission system that transmits each data forming a data stream by using a plurality of transmission paths.

BACKGROUND

Among conventional Cable Television (CATV) systems, there is a CATV system that sequentially divides a data stream into units of data for one frame and transmits the divided data by distributing the divided data to a plurality of transmission paths.

In this kind of the CATV system, data transmission speed of each transmission path differs from one another in response to traffic of the each transmission path. Consequently, there is a possibility that the each data is received at a receiver in different sequence than sequence in which the each data is transmitted from a sender.

In order to solve this problem, the CATV system disclosed in Unexamined Japanese Patent Publication No. 2005-86274 transmits data (timestamp data etc.) to compute delay time required for data transmission. Then, the CATV system computes the delay time of each transmission path and controls timing to transmit each data to the each transmission path based on the computed delay time.

SUMMARY

In the CATV system that computes the delay time as described above, transmitting the data used only for computing the delay time may set back transmitting a data stream, which needs to be primarily transmitted.

A purpose of this invention is to allow a receiver to receive each data forming a data stream transmitted by using a plurality of transmission paths in accordance with a transmission sequence at a sender, without interfering with each data transmission.

In a first aspect of the present invention, a data transmission system includes at least one first communication apparatus and at least one second communication apparatus. The first communication apparatus and the second communication apparatus are connected via a plurality of transmission paths. Detailed structures for the first and the second communication apparatuses are as follows.

The first communication apparatus includes a data transmission unit that sequentially transmits each data forming a data stream to any of the plurality of transmission paths along with additional information indicating transmission sequence of the each data.

The second communication apparatus includes a sequence specification unit that specifies the transmission sequence of the each data based on the additional information provided with the each data sequentially received from the first communication apparatus via the plurality of the transmission paths.

In the data transmission system, the transmission sequence of the each data forming the data stream is specified based on the additional information of the each data. Therefore, data transmission is unnecessary only for the purpose of specifying the transmission sequence between the first communication apparatus and the second communication apparatus.

According to the data transmission system, a receiver can receive the each data forming the data stream transmitted by using the plurality of transmission paths in accordance with the transmission sequence at a sender, without interfering with the each data transmission.

The first communication apparatus may be connected to at least one first external apparatus that outputs the data stream, and the data transmission unit of the first communication apparatus may transmit the each data outputted from the first external apparatus.

In this case, the each data of the data stream outputted from the first external apparatus can be transmitted to the second communication apparatus by using the plurality of transmission paths.

The second communication apparatus may be connected to at least one second external apparatus and the second communication apparatus may include a data output unit that outputs the each data to the second external apparatus in accordance with the transmission sequence specified by the sequence specification unit.

In this case, the second communication apparatus can output the each data received from the first communication apparatus via the plurality of the transmission paths to the second external apparatus in accordance with the transmission sequence of the each data.

In a case that the additional information indicates the transmission sequence of the each data in each session, the sequence specification unit of the second communication apparatus may specify the transmission sequence of the each data in the each session.

In this case, the second communication apparatus can specify the transmission sequence of the each data in the each session.

The data output unit of the second communication apparatus may output the each data in accordance with the transmission sequence in the each session specified by the sequence specification unit.

In this case, the second communication apparatus can output the each data to the second external apparatus in accordance with the transmission sequence of the each data in the each session.

The second communication apparatus may include a data memory unit that stores the each data received via the plurality of transmission paths in a predetermined data memory area.

In this case, there is no need for the sequence specification unit to specify the transmission sequence of the each data while the sequence specification unit receives the each data. Therefore, processing load required for specifying the transmission sequence can be reduced.

The additional information may be information included in each packet along with the each data.

In a second aspect of the present invention, a communication apparatus is connected to at least one different communication apparatus via a plurality of transmission paths and includes a data transmission unit that sequentially transmits each data forming a data stream to any of the plurality of transmission paths along with additional information indicating transmission sequence of the each data.

According to the communication apparatus, a portion of the above mentioned data transmission system can be realized.

The additional information may be information included in each packet along with the each data.

In a third aspect of the present invention, a communication apparatus is connected to at least one different communication apparatus via a plurality of transmission paths and includes a sequence specification unit that specifies transmission sequence of each data sequentially received via the plurality of the transmission paths based on additional information provided with the each data.

According to the communication apparatus, the above mentioned data transmission system can be realized.

The communication apparatus may be connected to at least one external apparatus and include a data output unit that outputs the each data to the external apparatus in accordance with the transmission sequence specified by the sequence specification unit.

In a case that the additional information indicates the transmission sequence of the each data in each session, the sequence specification unit of the communication apparatus is preferably configured to specify the transmission sequence of the each data in the each session.

In this case, the data output unit of the communication apparatus is preferably configured to output the each data in accordance with the transmission sequence in the each session specified by the sequence specification unit.

The communication apparatus may include a data memory unit that stores the each data received via the plurality of transmission paths in a predetermined memory area.

The additional information may be information included in each packet along with the each data.

In a fourth aspect of the present invention, a program is to make a computer function as the data transmission unit of the communication apparatus of the present invention.

According to the program, the computer can be functioned as the data transmission unit.

In a fifth aspect of the present invention, a program is to make a computer function as the sequence specification unit of the communication apparatus of the present invention.

According to the program, the computer can be functioned as the sequence specification unit.

In a sixth aspect of the present invention, a program is to make a computer function as the data output unit of the communication apparatus of the present invention.

According to the program, the computer can be functioned as the data output unit.

In a seventh aspect of the present invention, a program is to make a computer function as the data memory unit of the communication apparatus of the present invention.

According to the program, the computer can be functioned as the data memory unit.

Each of these programs discussed above includes a group of commands to be executed by a computer. These programs may be stored in a ROM, or a RAM for backup, and may be loaded to the computer from the ROM, or the RAM for backup to be executed. Alternatively, these programs may be loaded to the computer via a network to be executed.

These programs may be recorded on a computer-readable recording medium such as a flexible disk (FD), an optical disk (MO), a DVD, a CD-ROM, a Blu-ray disk, a HD-DVD, a hard disk and a memory card, and may be loaded to the computer from one of these recording mediums to be executed.

BRIEF DESCRIPTION OF THE DRAWINGS

An embodiment as the best mode to carry out the present invention will be described in detail below based on drawings.

THE BEST MODE TO CARRY OUT THE INVENTION

This embodiment is one example that the present invention is applied to a CATV system.

Figure 1:
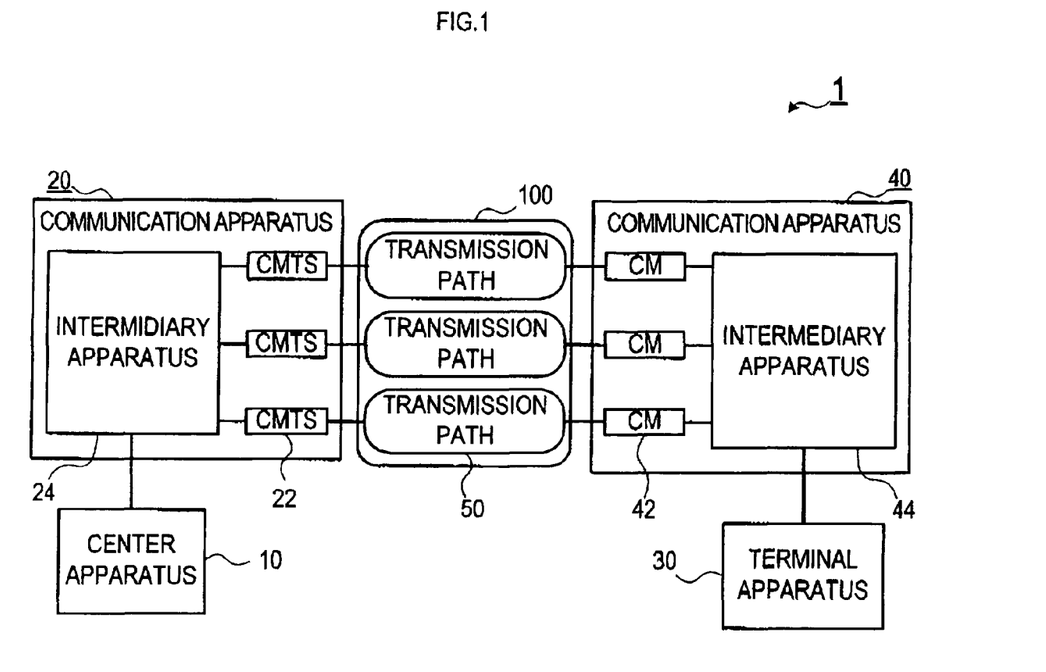
FIG. 1 is a block diagram showing an entire structure of a CATV system.

As shown in FIG. 1, a CATV system 1 of the present embodiment is provided with a communication apparatus 20 disposed in a CATV center side and a communication apparatus 40 disposed in a CATV subscriber's side. The communication apparatuses 20, 40 are connected to each other via a plurality of transmission paths 50 (in the present embodiment, there are three transmission paths) configuring a CATV network 100. In order to simplify an explanation, the CATV system 1 of the present embodiment is provided with only one communication apparatus 20 and only one communication apparatus 40. However, the CATV system 1 may be provided with a plurality of at least one of the communication apparatuses 20, 40.

The communication apparatus 20 is provided with a plurality of cable modem terminal systems (CMTS) 22 and an intermediary apparatus 24.

The each CMTS 22 is a well-known CMTS. The each CMTS 22 is connected to the intermediary apparatus 24 and one of the transmission paths 50.

The intermediary apparatus 24 is connected to all of the CMTS 22s and a center apparatus 10 disposed in the CATV center side. The intermediary apparatus 24 relays data transmission between all of the CMTS 22s and the center apparatus 10.

Figure 2A:
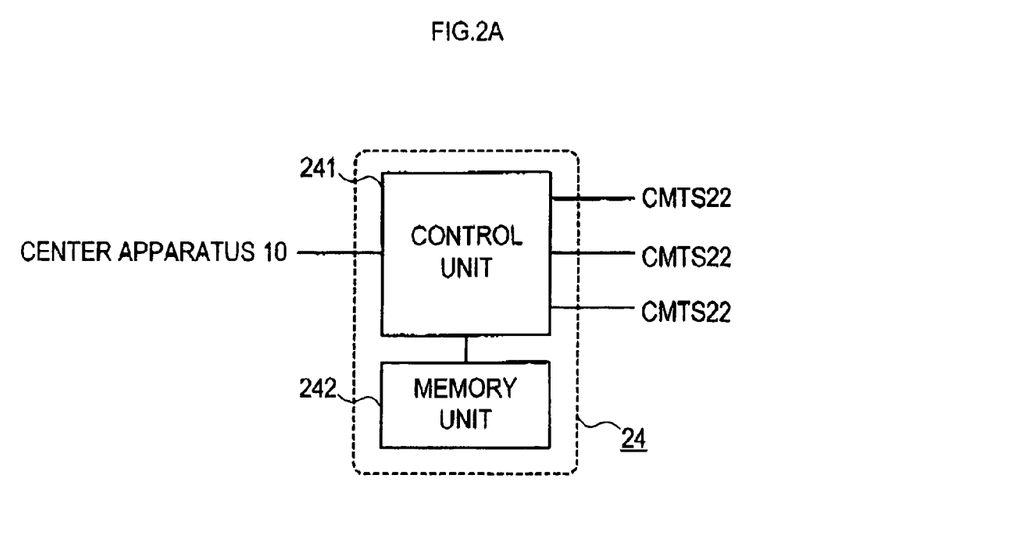
FIG. 2A is a block diagram showing a structure of a cable modem terminal system.

More specifically, the intermediary apparatus 24 is provided with a control unit 241 and a memory unit 242 (see FIG. 2A).

The control unit 241 includes a well-known CPU and a well-known transmission interface. The control unit 241 loads a variety of programs stored in the memory unit 242 and executes a variety of processes in accordance with the variety of programs loaded.

The memory unit 242 includes well-known memory elements (ROM, RAM etc.) and stores the variety of programs for the variety of processes to be executed by the control unit 241 in memory area of the memory unit 242. The variety of programs to be stored in the memory unit 242 may be recorded on a recording medium readable for the control unit 241 and be stored in the memory unit 242 from the recording medium. The variety of programs to be stored in the memory unit 242 may be stored in the memory unit 242 via a network.

In order to simplify an explanation, the intermediary apparatus 24 is connected to only one center apparatus 10 in the present embodiment. However, the intermediary apparatus 24 may be connected to a plurality of center apparatuses 10.

The communication apparatus 40 is provided with a plurality of cable modems (CM) 42 and an intermediary apparatus 44.

The each CM 42 is a well-known CM. The each CM 42 is connected to the intermediary apparatus 44 and one of the transmission paths 50.

The intermediary apparatus 44 is connected to all of the CM 42s and a terminal apparatus 30 of a CATV subscriber. The intermediary apparatus 44 relays data transmission between all of the CM 42s and the terminal apparatus 30.

Figure 2B:
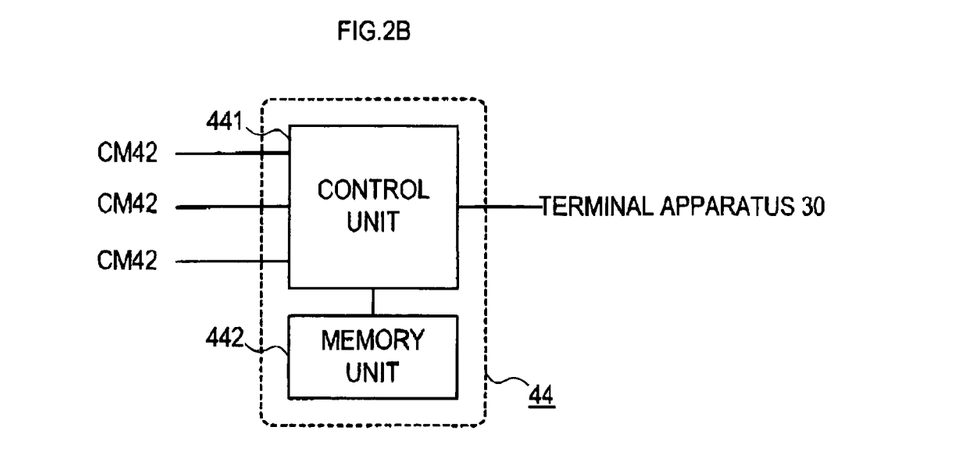
FIG. 2B is a block diagram showing a structure of a cable modem.

More specifically, the intermediary apparatus 44 is provided with a control unit 441 and a memory unit 442 (see FIG. 2B).

The control unit 441 includes a well-known CPU and a well-known transmission interface. The control unit 441 loads a variety of programs stored in the memory unit 442 and executes a variety of processes in accordance with the variety of programs loaded.

The memory unit 442 includes well-known memory elements (ROM, RAM etc.) and stores the variety of programs for the variety of processes to be executed by the control unit 441 in memory area of the memory unit 442. The variety of programs to be stored in the memory unit 442 may be recorded on a recording medium readable for the control unit 441 and be stored in the memory unit 442 from the recording medium. The variety of programs to be stored in the memory unit 442 may be stored in the memory unit 442 via a network.

In order to simplify an explanation, the intermediary apparatus 44 of the present embodiment is connected to only one terminal apparatus 30. However, the intermediary apparatus 44 may be connected to a plurality of the terminal apparatuses 30.

Hereinafter, referring to FIGS. 3 and 4, reception buffer process and buffer transmission process will be described. The reception buffer process and the buffer transmission process are executed by the control unit 241 of the intermediary apparatus 24 and the control unit 441 of the intermediary apparatus 44. The control units 241, 441 execute and repeat the reception buffer process and the buffer transmission process in parallel after start-up of the communication apparatuses 20, 40. Process flows for both of the control units 241, 441 will be described together; however, the control units 241, 441 independently execute the reception buffer process and the buffer transmission process.

Figure 3:
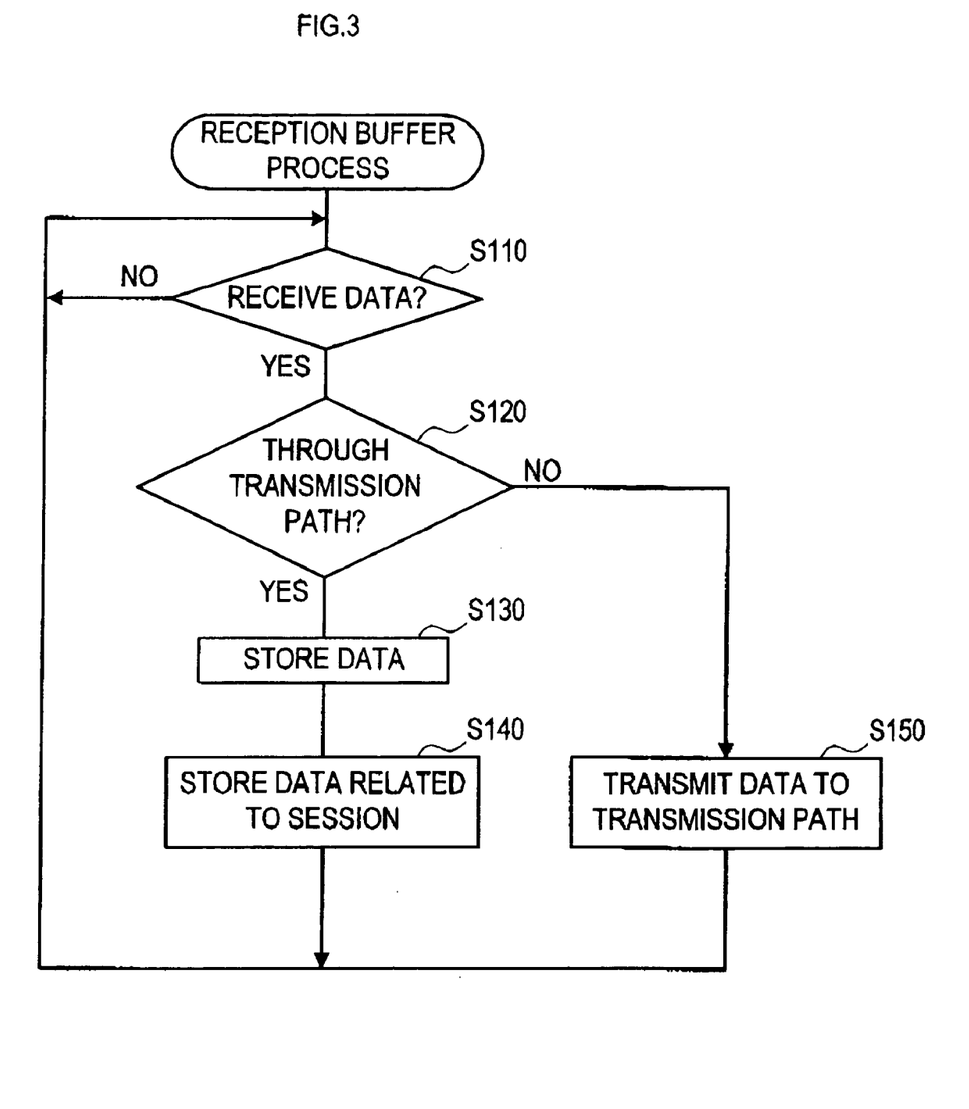
FIG. 3 is a flowchart illustrating a reception buffer process.

As shown in FIG. 3, when the reception buffer process is started, the control units 241, 441 determine whether or not the control units 241, 441 receive data (S110). More specifically, the control units 241, 441 determine whether or not the control units 241, 441 receive a cluster of information (packet), including data provided with header information.

Then, the control units 241, 441 continue the process of S110 as long as the control units 241, 441 receive no data (S110: NO). When the control units 241, 441 receive data (S110: YES), the control units 241, 441 determine whether or not the received data is received via one of the transmission paths 50 (S120). More specifically, the control units 241, 441 make the determination on the basis of a source IP address included in the header information provided with the received data.

When the control units 241, 441 determine that the received data is received via one of the transmission paths 50 (S120: YES), the control units 241, 441 store the received data in the memory units 241, 242 along with the header information (S130). Then, after the control units 241, 441 store information related to a session of the received data in the memory units 242, 442 (S140), the control units 241, 441 restart the reception buffer process from S110 described above. More specifically, at S140, the control units 241, 441 execute a process to register the source IP address, a destination IP address, a source port number, a destination port number and a prospect sequence number, included in the header information provided to the received data, in a data table (hereinafter, the data table will be referred to as a session table). The prospect sequence number is a parameter formed by adding a byte-size of a data area of the received data to a sequence number included in the header information.

At S120, when the control units 241, 441 determine that the received data is received from the external apparatus (i.e. the center apparatus 10, the terminal apparatus 30) connected to the communication apparatuses 20, 40 (S120: NO), the control units 241, 441 transmit the received data to one of the transmission path 50 (S150) and restart the reception buffer process from S110 as described above. More specifically, at S150, the control units 241, 441 select each of the transmission path 50 in a predetermined sequence or at random, then, transmit the received data to the selected transmission path 50 along with the header information.

Figure 4:
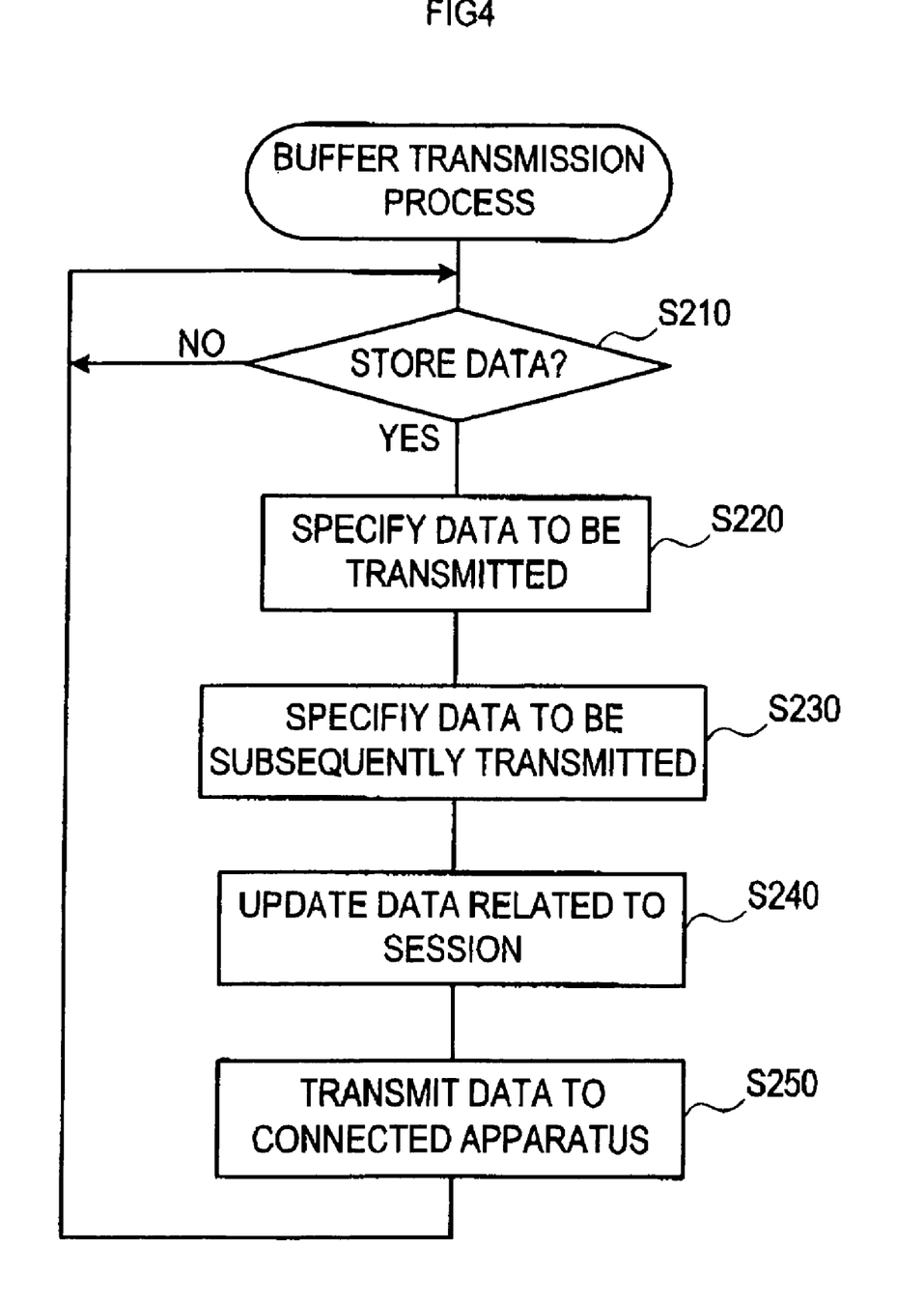
FIG. 4 is a flowchart illustrating a buffer transmission process.

As shown in FIG. 4, when the control units 241, 441 start the buffer transmission process, the control units 241, 441 determine whether or not received data is stored in the memory units 242, 442 (S210). When received data is not stored in the memory units 242, 442 (S210: NO), the control units 241, 441 continue the process of S210.

When received data is stored in the memory units 242, 442 (S210: YES), the control units 241, 441 specify data, regarding specific received data among the received data stored, to be transmitted to the external apparatus in the same session (flow) as the specific received data (S220). More specifically, the control units 241, 441 specify each of received data with the same content of the header information (i.e. the source IP address, the destination IP address, the source port number and the destination port number), among the received data stored in the memory units 242, 442, as the data to be transmitted to the external apparatus in the same session.

When the control units 241, 441 specify the data to be transmitted, the control units 241, 441 specify next data to be transmitted to the external apparatus among the specified data (S230). More specifically, the control units 241, 441 specify a record, where the same content of the header information for each of the data specified at S220 is registered, based on the session table described above. Then, the control units 241, 441 specify data, whose sequence number in the header information is identical to the prospect sequence number in the above-described record, as next data to be transmitted to the external apparatus among the data specified at S220. In other words, next data to be transmitted is data which is placed next in a data transmission sequence in a data stream to be transmitted in a session.

The control units 241, 441 update information related to the session stored in the memory units 242, 442, based on the information related to the session of the data specified at S230 (S240). More specifically, the control units 241, 441 update the record specified at S230, among the above mentioned session tables, with the header information of the data (the data to be transmitted) specified at S230. As in the process at S140, the byte-size in data area of the received data is added to the sequence number included in the header information of the data specified at S230 and the prospect sequence number is updated with this parameter.

After the control units 241, 441 transmit the data specified at S230 to the external apparatus (S250), the control units 241, 441 restart the buffer transmission process from S210. At S250, the control units 241, 441 not only transmit the data, but also delete the transmitted data in the memory area of the memory units 242,442.

As described above, in the data transmission system 1 of the present embodiment, when data stream transmission is performed, the communication apparatuses 20, 40 specify transmission sequence of each data forming a data stream received via the plurality of transmission paths 50, based on header information of the each data and transmit each of the data to the external apparatus in accordance with the specified transmission sequence.

In other words, when each data forming a data stream is transmitted by using the plurality of transmission paths 50, the data transmission system 1 can transmit each of the data to the external apparatus in the same transmission sequence of each of the data.

Moreover, the data transmission system 1 specifies transmission sequence of each data forming a data stream based on header information provided with the each data, and thereby additional data transmission is unnecessary only for the purpose of specifying the transmission sequence.

According to the data transmission system 1, transmitting a data stream, which needs to be primarily transmitted, can be prohibited from interfering.

Moreover, as the data transmission system 1 specifies transmission sequence of each data in each session, each of the data can be transmitted to the external apparatus in accordance with the transmission sequence in the each session.

Although the embodiment of the present invention has been described above, this invention is not limited to the embodiment discussed above. It will be obvious that this invention can take various forms without departing from the scope of this invention.

For example, in the above-mentioned embodiment, in order to specify session at S220, header information of data is referred. However, this invention is not limited to the embodiment, and any additional information provided with the data other than the header information may be referred.

Moreover, in the above-mentioned embodiment, in order to specify transmission sequence at S230, header information (sequence number) of data is referred. However, this invention is not limited to the embodiment, and any additional information provided with the data other than the header information (sequence number) may be referred.

Furthermore, in the buffer transmission process in the above-mentioned embodiment, data to be subsequently transmitted is specified and the specified data is transmitted. However, this invention is not limited to the embodiment. For example, at S140 of FIG. 3, transmission sequence of data for each session stored in the memory units 242, 442 may be permuted by the same processes at S220, S230 in FIG. 4. If the control unit 241, 441 determine "YES" at S210 in FIG. 3, the control units 241, 441 may transmit data to be subsequently transmitted at S250 in accordance with the permuted transmission sequence, without performing the processes from S220 to S240.

Moreover, in the above-mentioned embodiment, the present invention is applied to the CATV system. However, the present invention may definitely be applied to other types of data transmission systems (e.g. a moving image delivery system or a music delivery system).

Additionally, in the above-mentioned embodiment, the CPUs are the component of the control units; however, ASICs (Application Specific Integrated Circuits) or Programmable Logic Units (e.g. FPGA etc.), for example, may be the components for the units instead of the CPUs.

What is claimed is:

1. A data transmission system comprising:
   at least one first communication apparatus, and
   at least one second communication apparatus,
   wherein the first communication apparatus and the second communication apparatus are connected via a plurality of transmission paths,
   wherein the first communication apparatus includes a data transmission unit that sequentially transmits each data, forming a data stream, along any of the plurality of transmission paths together with accompanying additional information indicating a transmission sequence of the each data, with the additional information and the each data forming a packet of information, and the additional information at least including both a sequence number of the packet of information and a prospect sequence number formed by adding a byte-size of a data area in the each data, to which the additional information is to be added, to the sequence number, and
   wherein the second communication apparatus includes a sequence specification unit that specifies the transmission sequence of the each data based on the additional information included in the packet of information sequentially received from the first communication apparatus, via the plurality of transmission paths.

2. The data transmission system according to claim 1,
   wherein the first communication apparatus is connected to at least one first external apparatus that outputs the data stream, and
   wherein the data transmission unit of the first communication apparatus transmits the each data of the data stream outputted from the first external apparatus.

3. The data transmission system according to claim 1,
   wherein the second communication apparatus is connected to at least one second external apparatus, and
   wherein the second communication apparatus includes a data output unit that outputs the each data to the second external apparatus based on the transmission sequence specified by the sequence specification unit.

4. The data transmission system according to claim 3,
   wherein the additional information indicates the transmission sequence of the each data in each session,
   wherein the sequence specification unit of the second communication apparatus specifies the transmission sequence of the each data in the each session, and
   wherein the data output unit of the second communication apparatus outputs the each data in accordance with the transmission sequence of the each, session specified by the sequence specification unit.

5. The data transmission system according to claim 1,
   wherein the additional information indicates the transmission sequence of the each data in each session, and
   wherein the sequence specification unit of the second communication apparatus specifies the transmission sequence of the each data in the each session.

6. The data transmission system according to claim 1,
   wherein the second communication apparatus includes a data memory unit that stores the each data received via the plurality of transmission paths in a predetermined memory area.

7. A communication apparatus connected to at least one different communication apparatus via a plurality of transmission paths, the communication apparatus comprising:
   a data transmission unit that sequentially transmits each data, forming a data stream, together with additional information indicating a transmission sequence of the each data to any of the plurality of transmission paths, with the additional information and the each data forming a packet of information the additional information at least including both a sequence number of the packet of information and a prospect sequence number formed by adding a byte-size of a data area in the each data to which the additional information is to be added, to the sequence number.

8. The communication apparatus according to claim 7, further comprising a computer-readable recording medium that records a program that makes a computer function as the data transmission unit of the communication apparatus.

9. A communication apparatus connected to at least one different communication apparatus via a plurality of transmission paths comprising:
   a sequence specification unit that specifies transmission sequence of each data in a packet of information sequentially received, via the plurality of transmission paths, based on additional information included in the packet of information along with the each data, the additional information at least including both a sequence number of the packet of information and a prospect sequence number formed by adding a byte-size of a data area in the each data, to which the additional information is to be added, to the sequence number.

10. The communication apparatus according to claim 9, wherein the communication apparatus is connected to at least one external apparatus, and wherein the communication apparatus includes a data output unit that outputs the each data to the external apparatus in accordance with the transmission sequence specified by the sequence specification unit.

11. The communication apparatus according to claim 10, wherein the additional information indicates the transmission sequence of the each data in each session, wherein the sequence specification unit specifies the transmission sequence of the each data in the each session, and wherein the data output unit outputs the each data in accordance with the transmission sequence of the each session specified by the sequence specification unit.

12. The communication apparatus according to claim 10, further comprising a computer-readable recording medium that records a program that makes a computer function as the data output unit of the communication apparatus.

13. The communication apparatus according to claim 9, wherein the additional information indicates the transmission sequence of the each data in each session, and wherein the sequence specification unit specifies the transmission sequence of the each data in the each session.

14. The communication apparatus according to claim 9 comprising:
   a data memory unit that stores the each data received via the plurality of transmission paths in a predetermined memory area.

15. The communication apparatus according to claim 14, further comprising a computer-readable recording medium that records a program that makes a computer function as the data memory unit of the communication apparatus.

16. The communication apparatus according to claim 9, further comprising a computer-readable recording medium that records a program that makes a computer function as the sequence specification unit of the communication apparatus.

* * * * *